United States Patent
Chan

(10) Patent No.: US 7,589,770 B2
(45) Date of Patent: Sep. 15, 2009

(54) DEAD PIXEL REAL-TIME DETECTION METHOD FOR IMAGE

(75) Inventor: Chen-Hung Chan, Jhongli (TW)

(73) Assignee: Altek Corporation, Hsinchu (TW)

( * ) Notice: Subject to any disclaimer, the term of this patent is extended or adjusted under 35 U.S.C. 154(b) by 360 days.

(21) Appl. No.: 11/750,490

(22) Filed: May 18, 2007

(65) Prior Publication Data

US 2008/0151082 A1 Jun. 26, 2008

(30) Foreign Application Priority Data

Dec. 22, 2006 (TW) .............................. 95148659 A

(51) Int. Cl.
*H04N 9/64* (2006.01)
(52) U.S. Cl. ...................................... 348/246; 348/247
(58) Field of Classification Search ................. 348/246, 348/247
See application file for complete search history.

(56) References Cited

FOREIGN PATENT DOCUMENTS

TW I228237 2/2005

*Primary Examiner*—Sinh Tran
*Assistant Examiner*—Christopher K Peterson
(74) *Attorney, Agent, or Firm*—Rabin & Berdo, P.C.

(57) ABSTRACT

A dead pixel real-time detection method for image applicable in a digital camera is provided. The method is utilized to achieve the real-time detection of dead pixels in an image, upon obtaining the image by the digital camera, thus locating the dead pixel desired to be repaired. Through the real-time detection, the large amount of manpower and working-hours spent on detection and correction of the dead pixels of digital cameras on a production line can be saved, and the large amount of storage space occupied by the position information of the dead pixels in a digital camera can also be reduced. More importantly, in the detection process, the dead pixels can be determined more accurately through dynamically adjusting a threshold value as based on the different attributes of the various images, thus achieving the raising of the quality of the images significantly.

10 Claims, 3 Drawing Sheets

DEAD PIXEL REAL-TIME DETECTION METHOD FOR IMAGE

CROSS-REFERENCE TO RELATED APPLICATIONS

This non-provisional application claims priority under 35 U.S.C. § 119(a) on Patent Application No(s). 095148659 filed in Taiwan, R.O.C. on Dec. 22, 2006, the entire contents of which are hereby incorporated by reference.

BACKGROUND

1. Field of Invention

The invention relates to a dead pixel detection method for image, applicable in the image processing of a digital camera, and in particular to a dead pixel real-time detection method for image that can be realized through a dynamically varying threshold value.

2. Related Art

Presently, in the manufacturing process of digital camera, there exists the so-called "dead pixel correction procedure", namely, proceeding with the detection and correction of the dead pixel for the images taken by the image sensing elements (for example, charged coupled device (CCD) or CMOS) of a digital camera. Thus, the positions of possible dead pixels in an image sensing element is found through a determination logic relating to dead pixel, and is recorded in a storage medium of a digital camera, so that when an image of a picture is taken by a digital camera, the dead pixel in an image can be corrected (or repaired) by other image processing procedures based on the recorded information, thus raising the overall quality of the image.

This kind of prior art is a kind of non real-time detection and correction mechanism of dead pixels, that is mainly utilized to execute a preemptive detection of the inherent defection of an image sensing element that is liable to have dead pixels before the digital camera is shipped out of the factory, so that it may provide an image correction procedure for posterior correction, when the digital camera is used by a user in taking pictures However, this kind of detection tends to spend large amount of manpower and working-hours on the production line of digital camera. In addition, the dead pixel information thus detected and obtained tends to occupy the space of the built-in storage device in a digital camera. This is particularly important for a low-grade digital camera, since any of the storage space is valuable. Also, with the increase and progression of time after the digital camera is shipped out of the factory and put into the market, the image sensing element tends to deteriorate accordingly, so that other new dead pixels may result, thus the dead pixel information originally recorded in the digital camera when it is shipped out of the factory in no longer in conformity with the existing situation at present.

However, in reality, presently, the image processing capability of the digital camera is getting much stronger; therefore, the detection and repair of the dead pixel can be realized in a real-time manner. As disclosed in Taiwan Patent No. I228237, wherein, a method used for real-time dead pixel detection and repair is provided, that is especially related to the detection aspect. In that particular case, in order to save the image processing time and simplify the detection procedure of the dead pixel, a method is disclosed, in which the pixel-to-be-tested and the adjacent pixels on both sides of it (altogether 3 pixels) are chosen as the sample pixels for the determination logic, and that is utilized to achieve the objective of determining if the pixel-to-be-tested is indeed a dead pixel by making use of the correlation operation on the difference of gray level values of the pixel-to-be-tested and the pixels on both sides of it, and a fixed threshold value.

Through the application of this method, though the objective of saving the image processing time and simplifying the detection procedure can be achieved, yet there are deficiencies in the accuracy of determining the dead pixels. Taking it for an example, refer to FIG. 1, wherein, in case that the images along the central vertical direction present a line section of identical color, then in theory, the gray level values of the respective pixels in the central column will be identical as shown in the drawing (all of gray level value 200). In this case, if the method disclosed in Taiwan Patent No. I228237 is utilized, and then the pixel-to-be-tested (of gray level value 200) and the adjacent pixels on both side of it (all of gray level value 50) in the central row are taken as the sample pixels 10. In that situation, the central pixel in this row would be mistakenly judged as a dead pixel according to the determination logic, so that after reparation, its gray level value would be amended to be 50. Nevertheless, at this time, the line section of the identical color in the central vertical direction will indicate a disruption, that is not the results as desired to be achieved by this method. Moreover, the situation shown in FIG. 1B is taken as another example. Likewise, supposing that the pixels in the central row is taken as the sample pixels 10, and further supposing that the central pixel (namely, the pixel-to-be-tested) in the central row is a dead pixel, (and if at this time, the pixel-to-be-tested and the adjacent pixels on both sides of it are pixels of the identical color (the pixels to its left side are all of gray level value 200), thus in this case, if the method disclosed in Taiwan Patent No. I228237 is utilized, the dead pixel in the central row will be missed and neglected and may not be able to be detected at all. Thus, it is impossible to perform the correction and reparation required, and that is not the result desired to be achieved by the method either.

As such, in this respect, the conventional technology is liable to have the problems of misjudgment or missing negligence of the dead pixels. In addition, since fixed threshold value is used to carry out the determination of dead pixels, thus the attribute difference of the image itself can not be taken into consideration effectively to proceed with the detection of the dead pixels. Therefore, on the whole, the dead pixels can not be detected effectively for reparation, and thus the raise of image quality can not be achieved effectively.

SUMMARY OF THE INVENTION

In view of the above-mentioned problems and drawbacks of the prior art that presently too much manpower and working-hours are spent on detection and reparation of the dead pixels for the digital camera on the production line, and it also occupies too much memory space in a digital camera; in addition, in the application of the conventional method of detecting and repairing the dead pixels, misjudgment or missing negligence are liable to happen, and also the image attributes are not taken into full consideration; thus the invention provides a dead pixel real-time detection method for image, it mainly addresses the problem of how to proceed with the dead pixel detection for image, upon the images being taken by a digital camera.

Upon obtaining the image of an outside object, the digital camera selects subsequently the pixel-to-be-tested and its adjacent group pixels in performing the dead pixel detection until all the pixels desired to be tested are tested. Thus, in the invention, the following steps are executed for each of the pixels-to-be-tested:

(1) searching and finding out the first pixel and second pixel in the adjacent pixel groups, and calculating their gray level value difference;
(2) calculating the average gray level value of the pixels in the adjacent group other than the first pixel and second pixel;
(3) designating the sum of the average gray level value and the gray level value difference as an upper gray level threshold, and the difference of the average gray level value and the gray level value difference as a lower gray level threshold; and
(4) when the gray level value of the pixel-to-be-tested is outside the range between the upper gray level threshold and the lower gray level threshold, designating the pixel-to-be-tested as a dead pixel.

Through the application of the correlation operation of the gray level values between the pixel-to-be-tested and the pixels in the adjacent pixel groups in a 2-dimensional 3×3 image matrix, it is possible to detect real-time if the pixel-to-be-tested is a dead pixel. Since the detection is conducted real-time, thus the problem of similar process in prior art that too much manpower and working hours are spent on the production line, and the occupation of additional space in the memory storage of a digital camera can be solved. Moreover, since for different pixel-to-be-tested, different adjacent group of pixels are utilized as a basis of reference, hereby improving the misjudgment and missing negligence of the prior art realized through a fixed threshold value, thus achieving the superior performance and effectiveness of the invention.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus is not limitative of the invention, and wherein.

DETAILED DESCRIPTION OF THE INVENTION

The purpose, construction, features, and functions of the invention can be appreciated and understood more thoroughly through the following detailed description with reference to the attached drawings.

In the following, the preferred embodiments of the invention will be described in detail together with the attached drawings.

Figure 1A:
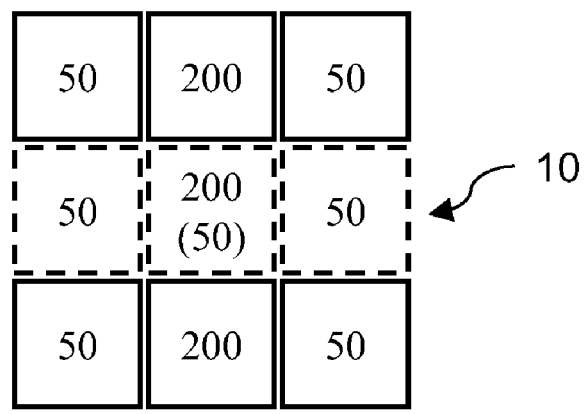
FIGS. 1A and 1B are the schematic diagrams illustrating respectively a dead pixel and its adjacent group of pixels in an image matrix according to the prior art.
Figure 1B:
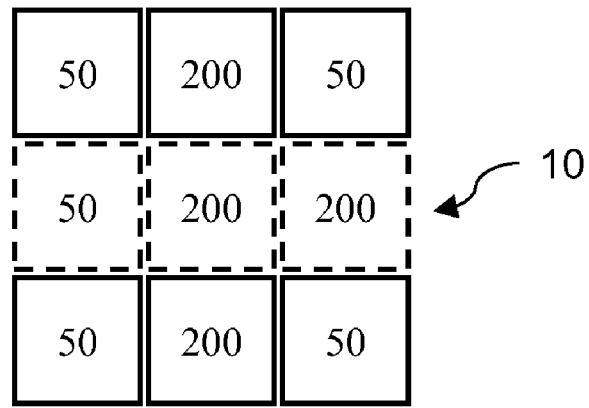
Figure 2:
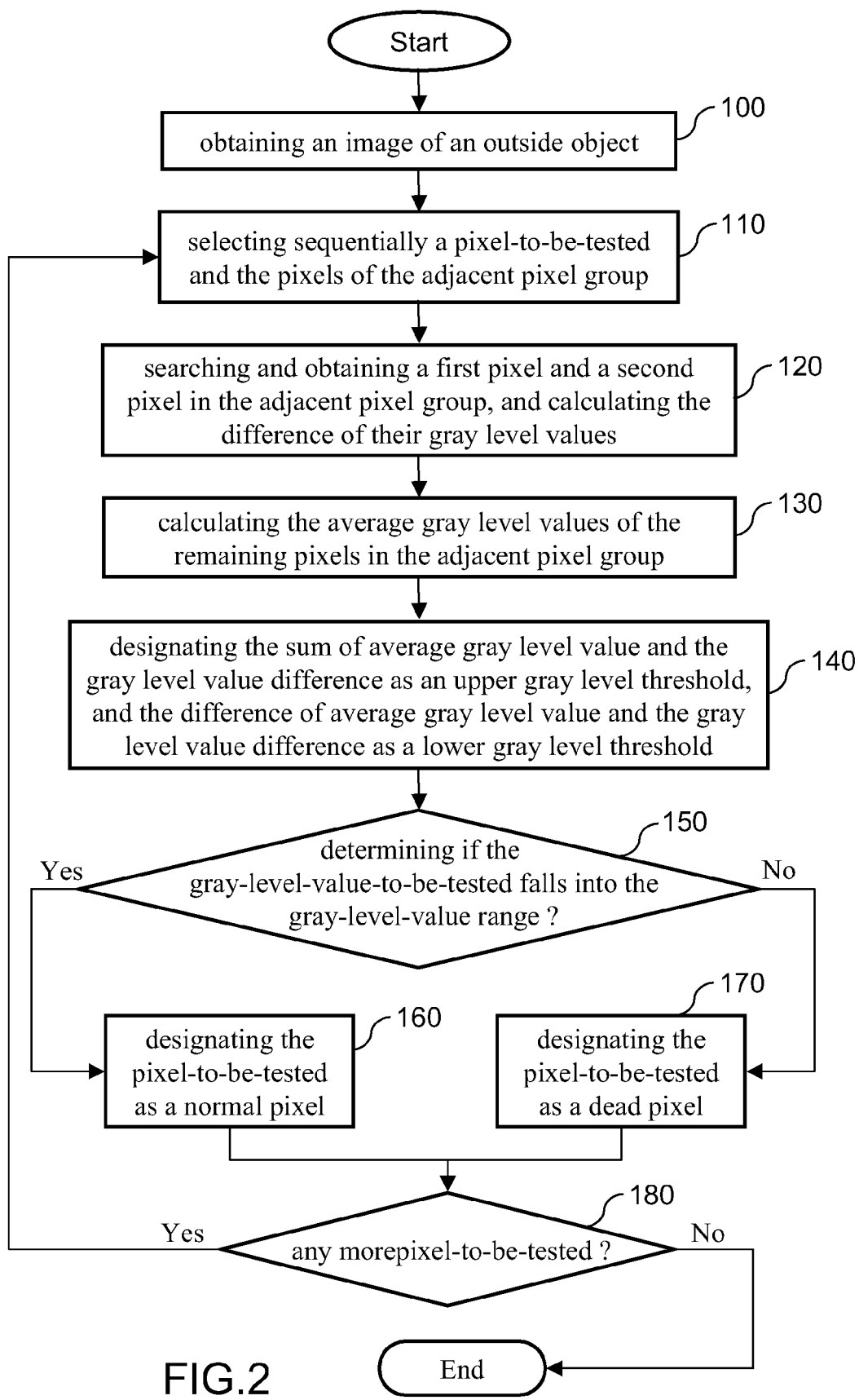
FIG. 2 is a system flowchart of the steps of the dead pixel real-time detection method for image according to an embodiment of the invention.

The invention provides a dead pixel real-time detection method for image that is applicable in the image processing of a digital camera. For the steps of the process flow of this method, refer to FIG. 2 for further details.

Firstly, obtaining an image of an outside object through the image sensing element (for example, CCD or CMOS) (step 100), basically, the pixels of the image thus obtained are arranged in a matrix and stored temporarily in a built-in storage medium (for example, flash memory) in a digital camera, and waiting for the execution of the subsequent dead pixel real-time detection procedures for image.

Figure 3A:
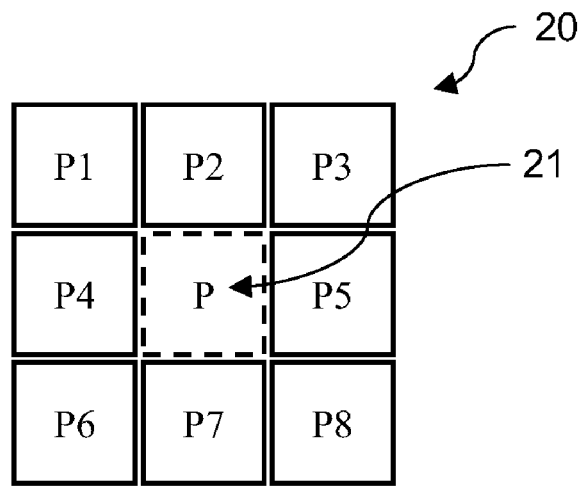
FIG. 3A is a schematic diagram illustrating a pixel-to-be-tested and pixels in its adjacent groups in an image matrix according to an embodiment of the invention.

Next, selecting sequentially according to their order of arrangement in the matrix the pixel-to-be-tested and the pixels of an adjacent group for executing the dead pixel detection (step 110). It must be noted here that, in the preferred embodiment of the invention, a 2-dimensional 3×3 image matrix 20 (refer to FIG. 3A) is utilized to proceed with the execution of dead pixel detection (however, it is not restricted to the size as specified in the 3×3 image matrix 20), since the combination of the pixel-to-be-tested and the pixels of the adjacent groups will result in the formation of a 3×3 image matrix 20. Wherein, the pixel-to-be-tested 21 refers to the central pixel in the image matrix 20 (for example, P as shown in FIG. 3A), and the pixels of the adjacent groups refer to the remaining pixels in image matrix 20 (for example, P1, P2, P3, P4, P5, P6, P7 and P8).

Based on the above description, in the application of the invention, the dead pixel detection is only performed on those pixels-to-be-tested 21 that can be formed into an image matrix 20, and for the remaining pixels (such as the pixel on the edge) that can not be formed into an image matrix 20, the dead pixel detection will not be performed, thus saving a part of the time and resources spent on executing the detection. Moreover, since in the actual output, the pixels on the edges of image will be ignored or neglected, therefore, the approach that the pixels that can not be formed into an image matrix will not be detected usually will not affect or degrade the overall quality of the image.

Figure 3B:
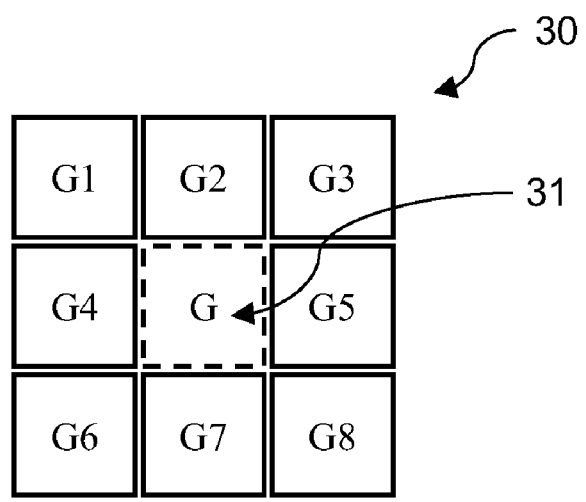
FIG. 3B is a schematic diagram illustrating a gray level value of a pixel-to-be-tested and the gray level values of pixels in it adjacent groups in an image matrix according to an embodiment of the invention.

In the actual detection of the dead pixels, the determination is mainly based on the gray level values of the respective pixels. Therefore, for ease of explanation, in the following, the image matrix 20 mentioned above can be envisioned as an image gray level value matrix 30 as shown in FIG. 3B, wherein, each of the respective pixels is represented by its gray level value. As such, the pixel-to-be-tested 21 mentioned above can be represented by the gray-level-value-to-be-tested 31 (for example, G as shown in FIG. 3B), and the gray level values of the remaining pixels in the adjacent pixel groups can be represented by G1, G2, G3, G4, G5, G6, G7, and G8 respectively as shown in FIG. 3B.

In the implementation of the dead pixel detection method of the invention, firstly, searching and obtaining two pixels (referred to here as the first pixel and the second pixel) in the adjacent pixel groups, and calculating the difference of their gray level values (step 120). In the preferred embodiment, the search is conducted in such a manner that the pixel having the second highest gray level value in the adjacent pixel groups is designated as the first pixel, and the pixel having the second lowest gray level value is designated as the second pixel. Taking the sequence of G1<G2<G3<G4<G5<G6<G7<G8 as an example, then the first pixel is G7, and the second pixel is G2. In case that the time and resources spent on the comparison of gray level values of the various pixels in the adjacent groups are not taken into consideration, then before the execution of step 120, the gray level values corresponding to various pixels in the adjacent group of pixels had better be sorted in advance, so that the second highest gray level value and the second lowest gray level value can be known directly from the results of the sorting.

In practice, the selection of the first pixel and the second pixel will have direct affect on the accuracy of the determination of dead pixels. Therefore, the selection and setting of the first pixel and the second pixel can be adjusted according to the sensitivity and accuracy required, and that is not limited to the disclosure given in the invention. Of course, the first pixel and the second pixel can be calculated and obtained by using the values of the weights designated to the first pixel and the second pixel corresponding to their position difference relative to the pixel-to-be-tested, so as to obtain more accurate detection results. As to the calculation of the gray level difference value mentioned above, it mainly concerns with the absolute value of difference value of the first pixel and the second pixel. In order to avoid that the gray level values of the first pixel and the second pixel being too close, usually, an additional predetermined gray level threshold value can be set, and that is used to replaced the calculated gray level difference value, in case that gray level difference value is not distinguishable enough (or not evident enough), thus reducing the possibility of misjudgment or missing negligence in determining the dead pixel.

Then, calculating the average gray level values of the remaining pixels in the adjacent group of pixels (step 130). As mentioned above, when the first pixel is represented by G7 and the second pixel is represented by G2, then the average gray level values of the remaining pixels can be calculated by utilizing each of G1, G3, G4, G5, G6 and G8 respectively, and that is realized through taking the average of the sum of gray level values of all the remaining pixels.

Subsequently, setting the threshold value used in determining whether the pixel-to-be-tested 21 is a dead pixel by making use of the average gray level value and the gray level value difference as calculated in the above-mentioned step 120 and step 130, including the following steps: firstly, designating the sum of the average gray level value and the gray level value difference as an upper gray level threshold, and the difference of average gray level value and the gray level value difference as a gray level lower threshold value (step 140). Next, forming a gray-level-value range that is used to determining if the gray-level-value-to-be-tested 31 belongs to a dead pixel through utilizing upper gray level threshold and lower gray level threshold, and determining if the gray-level-value-to-be-tested 31 falls into the gray-level-value range (step 150)? Then, when it is determined that the gray-level-value-to-be-tested 31 is in the range between upper gray level threshold and lower gray level threshold, then the pixel-to-be-tested 21 is a normal pixel (step 160). And finally, when it is determined that the gray-level-value-to-be-tested 31 is outside the range of upper gray level threshold and lower gray level threshold, then the pixel-to-be-tested 21 is a dead pixel (step 170).

Upon finishing detection and determination of the pixel-to-be-tested 21 (regardless of it is a normal pixel or a dead pixel), the process flow enters into step 180 in continuing selecting other pixel as the pixel-to-be-tested 21 and proceeding with the above-mentioned dead pixel detection for image. Thus, unless all the pixels-to-be-tested 21 have already tested, otherwise, the process flow will return to step 110 to continue the detection of other pixels-to-be-tested 21.

Though in the invention, the method disclosed is concerned with the dead pixel real-time detection technology for image, however, in applying it to a digital camera, it can further be utilized in combination with other procedures in realizing the subsequent image processing applications as required. Among them, the most frequently used application is to proceed with the reparation procedure of repairing the dead pixels found in a detection. The reparation procedure can be any of the conventional reparation procedures used in repairing the dead pixels as well known to the people with ordinary knowledge in this field. In this respect, usually, the adjacent pixel groups of the dead pixel is used as a basis of reparation, for example, the average of the sum of the gray level values of all the pixels in the adjacent pixel groups is utilized to replace the gray level value of the dead pixel; or alternatively, the middle value of the gray level values of all the pixels in the adjacent pixel groups is utilized to replace the gray level value of the dead pixel; other more complicated calculation algorithms making use of gray level values of pixels in the adjacent pixel groups can be utilized to replace the gray level value of the dead pixel for reparation. However, that will not be repeated here for brevity.

Basically, in the implementation of the invention, the dead pixel real-time detection can be performed right after obtaining the image of a picture by a digital camera, and then real-time repair can be carried out in cooperation with other reparation procedures. However, in conformity with the basic processing mechanism of digital camera concerning real-time image processing, in general, the reparation of all the dead pixels found in an entire image is performed merely once based on the detection results only after all the pixels in the entire image have been detected. Consequently, the method of the invention may further include the step of storing temporarily (namely, not permanently) the position information of the dead pixels in a built-in storage medium of flash memory, that could be used in the subsequent reparation procedure or other application procedures.

As such, the dead pixel real-time detection method of the invention may also be utilized in updating real-time the position information of dead pixels, namely, it incorporates the conventional method of storing permanently the position information of dead pixels. Thus, in carrying out the dead pixel detection each time, once a new dead pixel is found, then the position information of the original dead pixel is updated, hereby ensuring that the reparation procedure may always utilize the latest information in carrying out the reparation of the dead pixels.

In conclusion, on the whole, through the utilization of the invention in applying the real-time detection mechanism directly to a digital camera, the problem that too much manpower and working hours are spent on the production line for detecting and repairing the dead pixels in a digital camera, and also the problem that too much storage memory space of digital camera is occupied for this reparation purpose can be solved effectively. In addition, through the approach of dynamically adjusting threshold values according to the image attributes as disclosed in the invention, the misjudgment and missing negligence of the dead pixels that are liable to happen in the prior art can also be effectively avoided and improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dead pixel detection method for image applicable in a digital camera, comprising at least the following steps:
   obtaining an image by said digital camera; and
   selecting sequentially a pixel-to-be-tested from said image and an adjacent pixel group when there are pixels in said image that have not yet been detected, and executing the following steps:

searching a first pixel and a second pixel in said adjacent pixel group and calculating a gray level value difference of said first pixel and a second pixel;

calculating an average gray level value of the pixels in said adjacent pixel group other than said first pixel and said second pixel;

designating the sum of said average gray level value and said gray level value difference as an upper gray level threshold, and the difference of said average gray level value and said gray level value difference as a lower gray level threshold; and when the gray level value of said pixel-to-be-tested is outside the range of said upper gray level threshold and said lower gray level threshold, designating said pixel-to-be-tested as a dead pixel.

2. The dead pixel detection method for image applicable in a digital camera as claimed in claim 1, further comprising the step of:

designating said pixel-to-be-tested as a normal pixel when said gray level value of said pixel-to-be-tested is in said range of said upper gray level threshold and said lower gray level threshold.

3. The dead pixel detection method for image applicable in a digital camera as claimed in claim 1, wherein said pixel-to-be-tested is a central pixel in a 2-dimensional 3×3 image matrix.

4. The dead pixel detection method for image applicable in a digital camera as claimed in claim 3, wherein said adjacent pixel group contains the pixels in a 2-dimensional 3×3 image matrix other than said pixel-to-be-tested.

5. The dead pixel detection method for image applicable in a digital camera as claimed in claim 4, where said first pixel and said second pixel are the pixels having a second highest gray level value and a second lowest gray level in said adjacent pixel group respectively, and said calculating a gray level difference comprises the step of calculating the absolute value of a difference in gray value as between said first pixel and a second pixel.

6. The dead pixel detection method for image applicable in a digital camera as claimed in claim 5, further comprising the step of:

setting a predetermined gray level threshold value as said gray level value difference when said gray level value difference is lower than said predetermined gray level threshold value.

7. The dead pixel detection method for image applicable in a digital camera as claimed in claim 5, wherein said average gray level value is the average of the sum of said gray level values of all said pixels in said adjacent pixel group other than said first pixel and said second pixel.

8. The dead pixel detection method for image applicable in a digital camera as claimed in claim 5, further comprising the step of sorting the respective pixels in said adjacent pixel group according to their respective gray level values.

9. The dead pixel detection method for image applicable in a digital camera as claimed in claim 1, further comprising the step of:

executing a reparation procedure to proceed with the reparation of said dead pixel upon designating said pixel-to-be-tested as said dead pixel.

10. The dead pixel detection method for image applicable in a digital camera as claimed in claim 1, further comprising the step of:

storing position information of said pixel-to-be-tested in a storage medium upon designating said pixel-to-be-tested as said dead pixel.

* * * * *